(12) United States Patent
Ji et al.

(10) Patent No.: US 11,729,511 B2
(45) Date of Patent: Aug. 15, 2023

(54) METHOD FOR WALL LINE DETERMINATION, METHOD, APPARATUS, AND DEVICE FOR SPATIAL MODELING

(71) Applicant: Alibaba Group Holding Limited, Grand Cayman (KY)

(72) Inventors: Dinghuang Ji, Hangzhou (CN); Xiaoxu Leng, Hangzhou (CN); Zijing Huang, Hangzhou (CN); Siwang Li, Hangzhou (CN); Jingming Yu, Hangzhou (CN); Mengyi Liu, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 368 days.

(21) Appl. No.: 17/075,064

(22) Filed: Oct. 20, 2020

(65) Prior Publication Data

US 2021/0127060 A1 Apr. 29, 2021

(30) Foreign Application Priority Data

Oct. 25, 2019 (CN) .......................... 201911024592.X

(51) Int. Cl.
| | |
|---|---|
| *H04N 23/698* | (2023.01) |
| *G01B 5/008* | (2006.01) |
| *G01B 11/00* | (2006.01) |
| *H04N 13/243* | (2018.01) |
| *G06F 3/04815* | (2022.01) |
| *G06T 7/55* | (2017.01) |

(52) U.S. Cl.
CPC .......... *H04N 23/698* (2023.01); *G01B 5/008* (2013.01); *G01B 11/002* (2013.01); *G06F 3/04815* (2013.01); *G06T 7/55* (2017.01); *H04N 13/243* (2018.05)

(58) Field of Classification Search
CPC .. H04N 5/23238; H04N 13/243; G06T 17/00; G01B 11/002
See application file for complete search history.

(56) References Cited

U.S. PATENT DOCUMENTS

| | | | |
|---|---|---|---|
| 5,739,844 | A | 4/1998 | Kuwano et al. |
| 6,466,205 | B2 | 10/2002 | Simpson et al. |
| 6,553,184 | B1 | 4/2003 | Ando et al. |
| 7,123,263 | B2 | 10/2006 | Harvill |
| 7,321,374 | B2 | 1/2008 | Naske |
| 8,842,905 | B2 | 9/2014 | Hsieh et al. |
| 8,918,715 | B2 | 12/2014 | Herberger et al. |
| 9,369,697 | B2 | 6/2016 | Kumagai et al. |
| 9,407,904 | B2 | 8/2016 | Sandrew et al. |

(Continued)

OTHER PUBLICATIONS

Yang et al. ("Automatic 3D Indoor Scene Modeling from Single Panorama"). (Year: 2018).*

(Continued)

*Primary Examiner* — Kathleen V Nguyen
(74) *Attorney, Agent, or Firm* — James J. DeCarlo; Greenberg Traurig, LLP

(57) ABSTRACT

Provided in embodiments of the disclosure are methods, apparatuses, and devices for spatial modeling. In one embodiment, a method comprises acquiring a panoramic image captured in a space; determining wall lines in the panoramic image based on Manhattan-World structural features of wall surfaces; and constructing a three-dimensional model for the space based on the wall lines.

18 Claims, 19 Drawing Sheets

(56) References Cited

U.S. PATENT DOCUMENTS

| | | |
|---|---|---|
| 10,190,792 B2 | 1/2019 | Jacobson et al. |
| 2007/0279412 A1 | 12/2007 | Davidson et al. |
| 2008/0181486 A1 | 7/2008 | Spooner et al. |
| 2009/0219383 A1 | 9/2009 | Passmore |
| 2011/0164109 A1 | 7/2011 | Baldridge et al. |
| 2013/0179841 A1 | 7/2013 | Mutton et al. |
| 2014/0125654 A1 | 5/2014 | Oh |
| 2014/0301633 A1 | 10/2014 | Furukawa et al. |
| 2014/0365181 A1 | 12/2014 | Cockburn et al. |
| 2016/0048934 A1 | 2/2016 | Gross |
| 2016/0378887 A1 | 12/2016 | Maldonado |
| 2017/0177748 A1* | 6/2017 | High .................. G06T 17/05 |
| 2018/0096527 A1 | 4/2018 | Eraker et al. |

OTHER PUBLICATIONS

International Search Report and Written Opinion to corresponding International Application No. PCT/US2020/056582 dated Jan. 12, 2021 (10 pages).

Yang et al., "Automatic 3D Indoor Scene Modeling from Single Panorama," IEEE Jun. 2018, https://openaccess.thecvf.com/content_cvpr_2018_papers_backup/Yang_Automatic_3D_Indoor_CVPR_2018_paper.pdf, pp. 3926-3934 (2018).

International Preliminary Report on Patentability to corresponding International Application No. PCT/US2020/056582, dated May 5, 2022, 8 pages (2022).

* cited by examiner

METHOD FOR WALL LINE DETERMINATION, METHOD, APPARATUS, AND DEVICE FOR SPATIAL MODELING

CROSS-REFERENCE TO RELATED APPLICATIONS

The present application claims priority to the Chinese Patent Application No. 201911024592.X filed on Oct. 25, 2019, which is incorporated by reference herein in its entirety.

BACKGROUND

Technical Field

The disclosure relates to the field of Internet technologies, and in particular, to methods, apparatuses, and devices for wall line determination, as well as methods, apparatuses, and devices for spatial modeling.

Description of Related Art

With the continuous development in technologies, many tasks can be performed online via the Internet.

For instance, a renter or buyer interested in renting or purchasing a factory or residential housing needs to visit the site in person, which is time-consuming and effort-intensive. Current technologies do not allow a customer to intuitively view information about spaces (e.g., a factory, residential housing, etc.) without making a trip and thus are in urgent need of technical solutions.

SUMMARY

Provided in the disclosed embodiments are methods, apparatuses, and devices for wall line determination, as well as methods, apparatuses, and devices for spatial modeling. Embodiments of the disclosure enable constructions of a three-dimensional model for a space (e.g., a factory, residential housing, etc.) such that a renter/buyer can quickly and conveniently obtain relevant information for the space by viewing the three-dimensional model online.

In one embodiment, the disclosure provides a method for spatial modeling, the method comprising: acquiring a panoramic image captured in a space; determining wall lines in the panoramic image based on Manhattan-World structural features of wall surfaces; and constructing a three-dimensional model for the space based on the wall lines.

In one embodiment, the disclosure provides an apparatus for spatial modeling, the apparatus comprising: an acquisition module configured to acquire a panoramic image captured in a space; a wall line determination module configured to determine wall lines in the panoramic image based on Manhattan-World structural features of wall surfaces; and a modeling module configured to construct a three-dimensional model for the space based on the wall lines.

In one embodiment, the disclosure provides an electronic device for spatial modeling, the electronic device comprising: a processor, and a memory configured to store thereon executable code that, when executed by the processor, causes the electronic device to implement the methods for spatial modeling described herein.

In one embodiment, the disclosure provides a non-transitory machine-readable storage medium configured to store thereon executable code that, when executed by a processor of an electronic device, causes the electronic device to implement the methods for spatial modeling described herein.

In one embodiment, the disclosure provides a method for wall line determination, the method comprising: acquiring a picture captured in a space; identifying a preset object in the picture; and determining wall lines in the picture based on an association relationship between the object and wall surfaces.

According to various embodiments of the disclosure, to create a three-dimensional (3D) model for a space (e.g., a room), a panoramic image of the space is photographed and acquired, and wall lines included in the panoramic image are determined based on Manhattan-World structural features of wall surfaces (e.g., structural features of wall surfaces being perpendicular to each other). The wall lines reflect the positions of each wall surface in the space, and the positions of each wall surface in the space also reflects an overall shape of the space. As such, a three-dimensional model of the space is constructed accurately based on the determined wall lines together with the camera photographing parameters.

BRIEF DESCRIPTION OF THE DRAWINGS

To illustrate the technical solutions in the embodiments of the disclosure more clearly, drawings used in the description of the embodiments are briefly introduced in the following description. The drawings in the following description are some embodiments of the disclosure. For those of ordinary skill in the art, other drawings can be obtained from these drawings without significant efforts.

DETAILED DESCRIPTION

To further describe the purposes, technical schemes, and advantages of the embodiments of the disclosure, the technical solutions in the embodiments of the disclosure will be described clearly and completely below with reference to the drawings. The described embodiments are merely some, rather than all of the embodiments, of the disclosure. Based on the embodiments of the disclosure, other embodiments obtained by those of ordinary skill in the art without making significant efforts fall within the scope of the disclosure.

The terminology used in the embodiments of the disclosure is for the purpose of describing particular embodiments only and is not intended to limit the disclosure. The singular forms "a," "said," and "the" used in the embodiments of the disclosure and the appended claims are also intended to include plural forms. Unless the context clearly indicates other meanings, "a plurality of" generally includes at least two.

Depending on the context, the words "if" and "in case of" as used herein can be interpreted as "at the time . . . " or "when . . . " or "in response to the determination" or "in response to the detection." Similarly, depending on the context, the phrase "if it is determined" or "if (the stated condition or event) is detected" can be interpreted as "when it is determined" or "in response to the determination" or "when (the stated condition or event) is detected" or "in response to the detection of (the stated condition or event)."

It should also be noted that the terms "include," "comprise," or any other variation thereof are intended to encompass non-exclusive inclusions, so that a commodity or system including a series of elements includes not only those elements but also other elements that are not explicitly listed, or includes elements that are inherent to this commodity or system. Without more restrictions, an element defined by the sentence "including a(n) . . . " does not exclude the existence of another identical element in the commodity or system including the element.

To implement methods for spatial modeling based on embodiments of the disclosure, hardware devices include a camera and a computing device may be used. In some embodiments, when the camera has computing capabilities meeting the requirements, a spatial modeling method is performed by the camera. When the spatial modeling method is performed by a camera in conjunction with a computing device (e.g., a PC computer, a notebook computer, a mobile phone, and a server), the camera is configured to capture a panoramic image of a space; and the computing device is configured to process the panoramic image.

Figure 1:
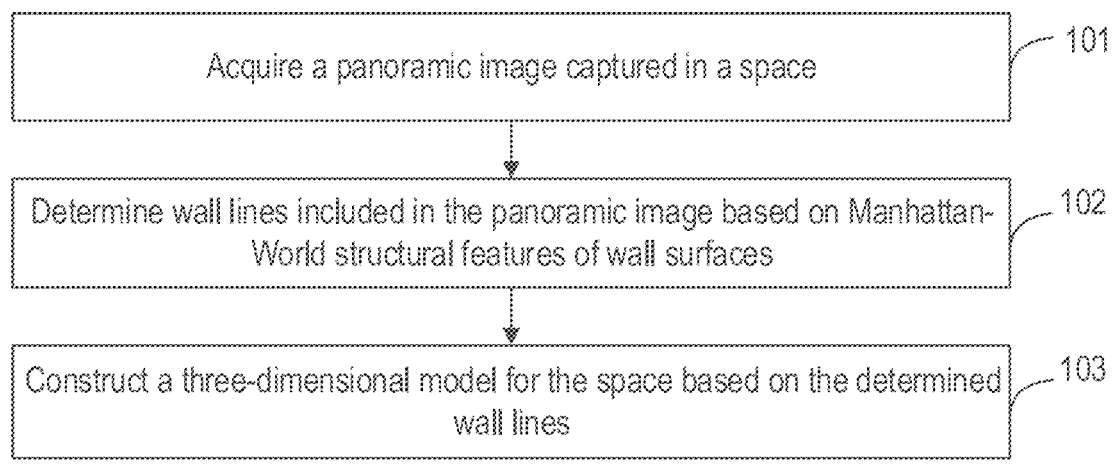
FIG. 1 is a flow diagram illustrating a method for spatial modeling according to some embodiments of the disclosure.

FIG. 1 is a flow diagram illustrating a method for spatial modeling based on some embodiments of the disclosure. In some embodiments and as shown in FIG. 1, the method includes the following steps.

Step 101: acquire a panoramic image captured in a space.

Step 102: determine wall lines included in the panoramic image based on Manhattan-World structural features of wall surfaces.

Step 103: construct a three-dimensional model of the space based on the determined wall lines.

According to various embodiments, the space includes any structural space, such as a factory, a room of a residential housing, an office, etc. In some embodiments, the space comprises a ceiling, a floor, and walls.

In some embodiments, a panoramic image of a space is captured by a camera capable of photographing a panoramic image to obtain the above-described panoramic image. In one example, one panoramic image is captured for one space. In other examples, if the space is a large area, a plurality of panoramic images are captured. Subsequent processing of the panoramic image is the same. In some examples, a camera is further used to capture for the space video pictures, on which image frame segmentation is performed. Afterwards, subsequent processing such as to detect wall lines and the like is performed on the obtained images.

With a panoramic image of a space captured, to create a three-dimensional model of the space based on the panoramic image, first, the shape of the space is determined based on the panoramic image. Wall surface information of the space typically is capable of reflecting the shape of the space. Therefore, in some embodiments, the method first analyzes the panoramic image to determine the wall surface information of the space, such as positions and sizes of wall surfaces.

In some embodiments, the wall lines included in the panoramic image are obtained by performing wall line detection processing on the panoramic image. In some embodiments, the wall lines are the boundary lines of the wall surfaces. As such the information of each wall surface included in the space is obtained from the results of wall line detection.

In some embodiments, to accurately detect the wall lines from the panoramic image, the process of wall line detection is performed on the panoramic image in connection with Manhattan-World structural features of the wall surfaces to determine the wall lines included in the panoramic image. Manhattan-World structural features of the wall surfaces refer to the structural features where adjacent wall surfaces are perpendicular to each other.

In some embodiments, to determine wall lines included in the panoramic image, the panoramic image is first input into a wall line detection model, which outputs a first wall line. Next, the first wall line is corrected based on the Manhattan-World structural features of the wall surfaces to obtain a second wall line. At this point, the obtained second wall line conforming to the definition of Manhattan-World structural features. This way, a three-dimensional model of the space is constructed with reference to the corrected second wall line and camera photographing parameters.

In some embodiments, the wall line detection model comprises a pre-trained model for wall line detection, which may be implemented as a network model such as a convolutional neural network, (CNN) and the like. In some examples, the wall line detection model is an existing model used for wall line detection based on current technologies.

In some embodiments, to improve the accuracy of the wall line detection result, before the panoramic image is inputted into the wall line detection model, the panoramic image is pre-processed. For example, processing such as image enhancement, orientation correction, and the like is performed on the panoramic image such that vertical wall lines in the panoramic image are parallel to a vertical axis of the image, etc.

Figure 2:
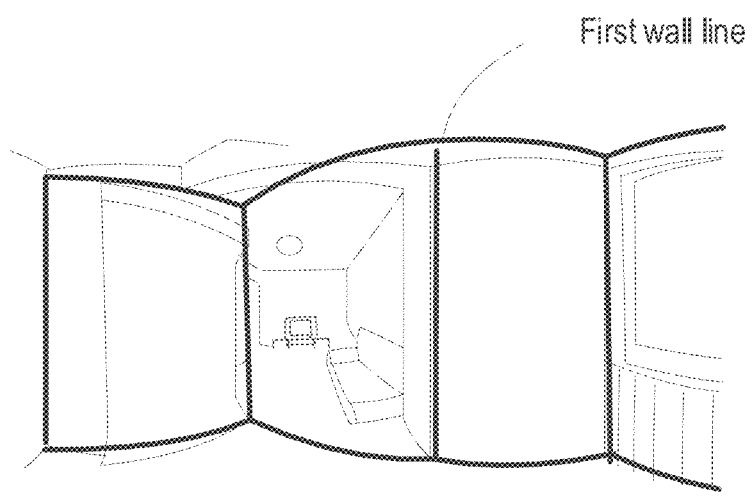
FIG. 2 is a block diagram illustrating wall lines before correction according to some embodiments of the disclosure.
Figure 3:
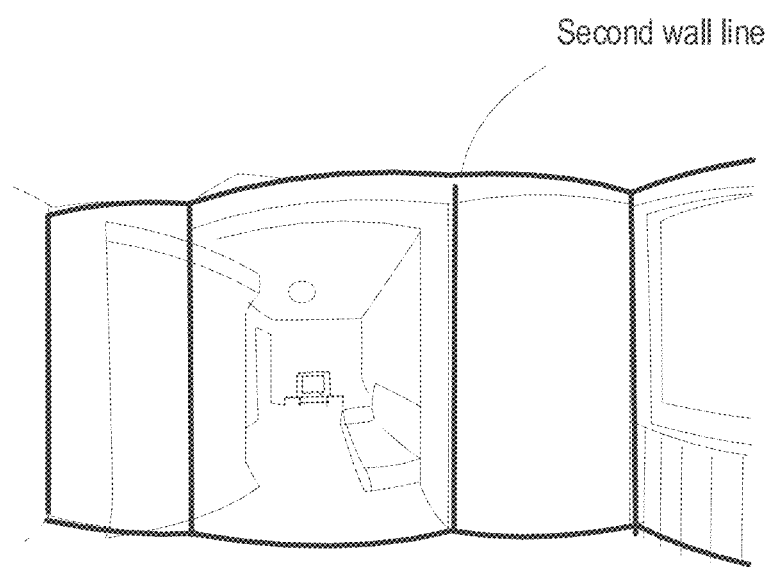
FIG. 3 is a block diagram illustrating a result of corrected wall lines of FIG. 2 according to some embodiment of the disclosure.

To illustrate in comparison, now referring to FIGS. 2-3, differences between the first wall line and the second wall line are described in further detail herein. FIG. 2 is a block diagram illustrating a first wall line detected and output by the wall line detection model, according to some embodiments of the disclosure. In FIG. 2, due to the obscuring of furniture, the wall line detection model mistakenly regards a boundary of the furniture obscuring the wall line as the wall line. FIG. 3 is a block diagram illustrating a second wall line obtained by correcting the first wall line based on the Manhattan-World structural features of the wall surfaces.

The following describes a method for correcting the above-described first wall line to obtain the second wall line based on the Manhattan-World structural features of the wall surfaces. The method includes the following steps.

Step 1: mapping the first wall line onto a horizontal plane to obtain a plurality of line segments corresponding to the first wall line.

Step 2: correcting the plurality of line segments based on the Manhattan-World structural features of the wall surfaces.

Step 3: mapping the plurality of corrected line segments into the panoramic image to obtain the second wall line.

In some embodiments, the above-described horizontal plane is a ground or ceiling. In some embodiments, when a user uses a camera to capture a panoramic image of the space, the camera is at a certain height from the ground. From the perspective of the camera, a camera rotated upwards will capture pictures of the upper parts of wall surfaces in the space; and a camera rotated downwards will capture pictures of the lower parts of the wall surfaces. Therefore, as shown in FIG. 2, the first wall line output by the wall line detection model is composed of two symmetrical upper and lower wall lines, as schematically shown in FIG. 2.

In some implementations, the upper wall line is selected as the first wall line, and the first wall line is projected onto the ceiling to obtain the above-described plurality of line segments. At this point, the first wall line is regarded as being formed by sequentially connecting upper boundary lines of the wall surfaces in the space, and that the above-described plurality of line segments correspond to the upper boundary lines of the wall surfaces.

Figure 4:
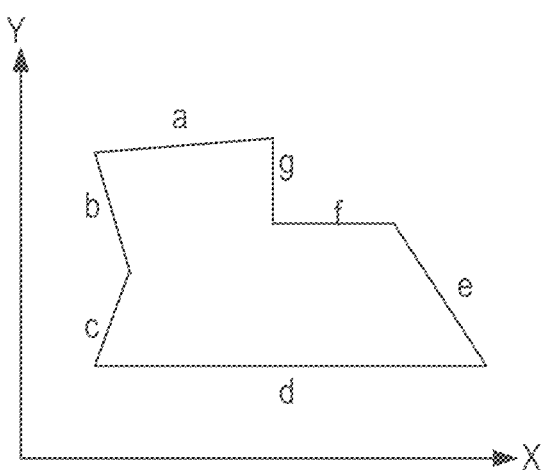
FIG. 4 is a block diagram illustrating wall lines projected into a plurality of line segments according to some embodiments of the disclosure.
Figure 5:
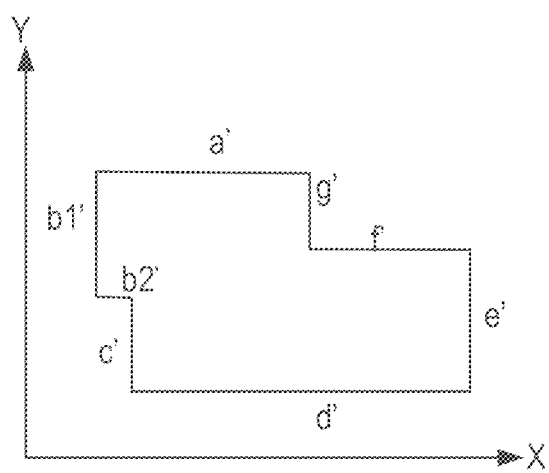
FIG. 5 is a block diagram illustrating a result of corrected line segments of FIG. 4 according to some embodiments of the disclosure.

In some embodiments, affected by the capturing angle and the like of the camera when the panoramic image is captured, an object such as furniture may block a wall line. In this case, the first wall line output by the wall line detection model may contain an error. In one example, and as shown in FIG. 4, the plurality of line segments obtained by mapping the first wall line onto the ceiling includes a line segment a, a line segment b, a line segment c, a line segment d, a line segment e, a line segment f, and a line segment g. As illustrated in FIG. 4, the plurality of line segments does not conform to the definition of Manhattan-World structural features of the wall surfaces. Specifically, based on the Manhattan-World structural features of the wall surfaces, adjacent wall surfaces are in a perpendicular relationship. That is, the upper boundaries of adjacent wall surfaces are in a perpendicular relationship. In other words, if the estimation of the first wall line is correct, the two adjacent line segments among the plurality of line segments in FIG. 4 should be in a perpendicular relationship. However, the plurality of line segments schematically shown in FIG. 4 is not in a perpendicular relationship. Therefore, the detection result of the first wall line is considered inaccurate and needs to be corrected. FIG. 5 is a block diagram illustrating a second wall line according to some embodiments of the disclosure. In some embodiments, a correction result is shown in FIG. 5. Here, a plurality of corrected line segments (a line segment a', a line segment b1', a line segment b2', a line segment c', a line segment d', a line segment e', a line segment f, and a line segment g') have the features that the adjacent line segments are in a perpendicular relationship.

Next, the plurality of corrected line segments is mapped into the panoramic image to obtain the correction result of the first wall line, e.g., the second wall line.

The following describes a method to correct the plurality of line segments shown in FIG. 4 to obtain a plurality of line segments schematically shown in FIG. 5.

First, confidence levels corresponding to the plurality of line segments are determined, respectively. Next, the line segments are corrected sequentially, in an order of the confidence levels ranking from high to low, so that the corrected adjacent line segments meet the perpendicular relationship.

In some embodiments, the confidence level of a line segment reflects the probability of the line segment being a legitimate wall line.

In some embodiments, the confidence levels corresponding to the plurality of line segments are determined respectively by the following step.

For a line segment of a plurality of line segments, determining a target coordinate axis corresponding to the line segment based on included angles formed by the line segment with horizontal and vertical axes, respectively. An included angle between the line segment and the target coordinate axis is smaller than an included angle between the line segment and a non-target coordinate axis. The included angle between the line segment and the target coordinate axis is designated as the confidence level of the line segment.

Figure 6:
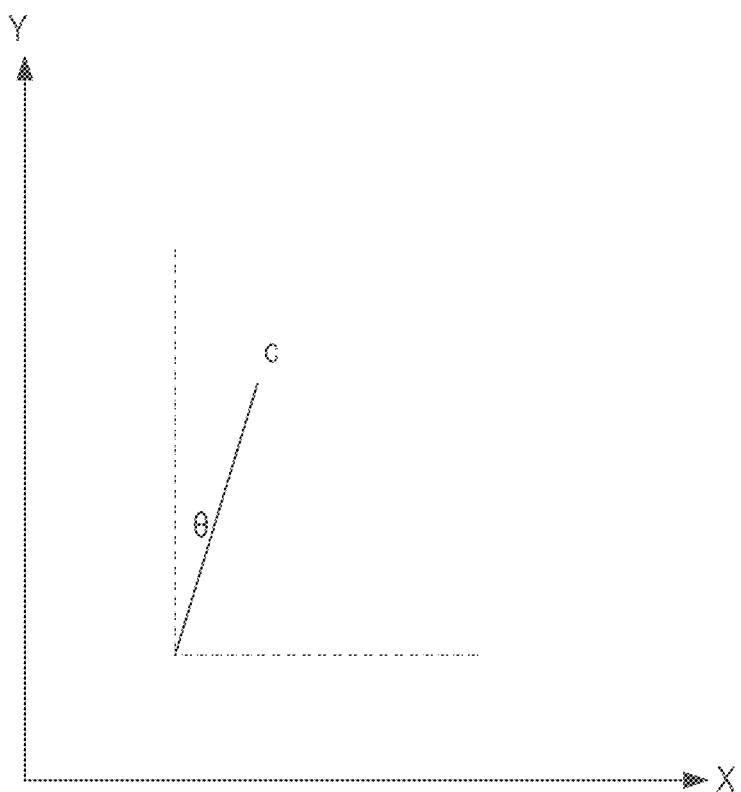
FIG. 6 is a block diagram illustrating a principle for determining a confidence level for a line segment according to some embodiments of the disclosure.

FIG. 6 is a block diagram illustrating a method for determining a confidence level of a line segment, according to some embodiments of the disclosure. Here, the line segment c in the plurality of line segments of FIG. 4 is used as an example.

As shown in FIG. 6, a two-dimensional coordinate system is established on a horizontal plane, onto which the first wall line is projected. A horizontal axis is represented by X; and a vertical axis is represented by Y. For the line segment c, included angles formed by the line segment c with the X axis and Y axis are determined, respectively. In this example shown in FIG. 6, the included angle formed by the line segment c with the Y axis is smaller than the included angle formed by the line segment c with the X axis. Therefore, the Y axis is determined as the target coordinate axis corresponding to the line segment c; and the angle θ formed by the line segment c with the Y axis is further determined as the confidence level of the line segment c.

In some embodiments, the respective confidence levels corresponding to the plurality of line segments are determined by the following steps.

Step 1: for a line segment in a plurality of line segments, determining a target coordinate axis corresponding to the line segment based on included angles formed by the line segment with horizontal and vertical axes, respectively. An included angle between the line segment and the target coordinate axis is smaller than an included angle between the line segment and a non-target coordinate axis.

Step 2: fitting a fitted line segment extending through a midpoint of the line segment, the fitted line segment being parallel to the target coordinate axis.

Step 3: determining distances from a plurality of points on the line segment to the fitted line segment respectively.

Step 4: determining a ratio between the number of points having a distance less than a set threshold and the total number of the plurality of points, and designating the ratio as the confidence level of the line segment.

Figure 7:
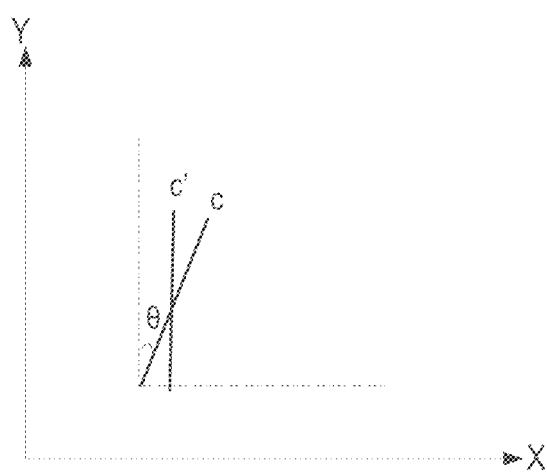
FIG. 7 is a block diagram illustrating a principle for determining a confidence level for a line segment according to some embodiments of the disclosure.

FIG. 7 is a block diagram illustrating a method for determining a confidence level of a line segment, according to some embodiments of the disclosure. Here, the line segment c in the plurality of line segments of FIG. 4 is still used as an example.

First, similar to the diagram shown in FIG. 6, the target coordinate axis corresponding to the line segment c is determined first. As above-described and illustrated in FIG. 6, for the line segment c, the target coordinate axis is the Y axis. Next, a line segment, extending through the midpoint of the line segment c and parallel to the Y axis, is fitted by using a fitting method. The line is referred to herein as a fitted line segment, and shown as the line segment c' in FIG. 7. Further, a plurality of points is selected on the line segment c, and distances from the plurality of points to the line segment c' are computed, respectively. When a total of N number of points are selected, if the distances from an M number of points of the N number of points to the line segment c' are less than a set threshold, a ratio M/N is designated as the confidence level of the line segment c.

After the respective confidence levels corresponding to the plurality of line segments are determined, the plurality of line segments are sequentially corrected in the order of the confidence levels ranking from high to low, as a result of which the corrected adjacent line segments are the perpendicular relationship.

In sum, a line segment that needs to be corrected, referred to herein as the first line segment. is determined based on the order of the confidence levels. Then the first line segment is corrected with reference to the correction situations associated with the two line segments connected to the two end points of the first line segment, respectively (referred to herein as the second line segment, and the third line segment, respectively).

FIGS. 8-14 are block diagrams illustrating methods for correcting the plurality of line segments, according to some embodiments of the disclosure. Here, the plurality of line segments of FIG. 4 is used as an example.

Here, the result of sorting the plurality of line segments shown in FIG. 4 based on the confidence levels from high to low is as follows: the line segment d, the line segment f, the line segment g, the line segment a, the line segment c, the line segment e, and the line segment b.

Figure 8:
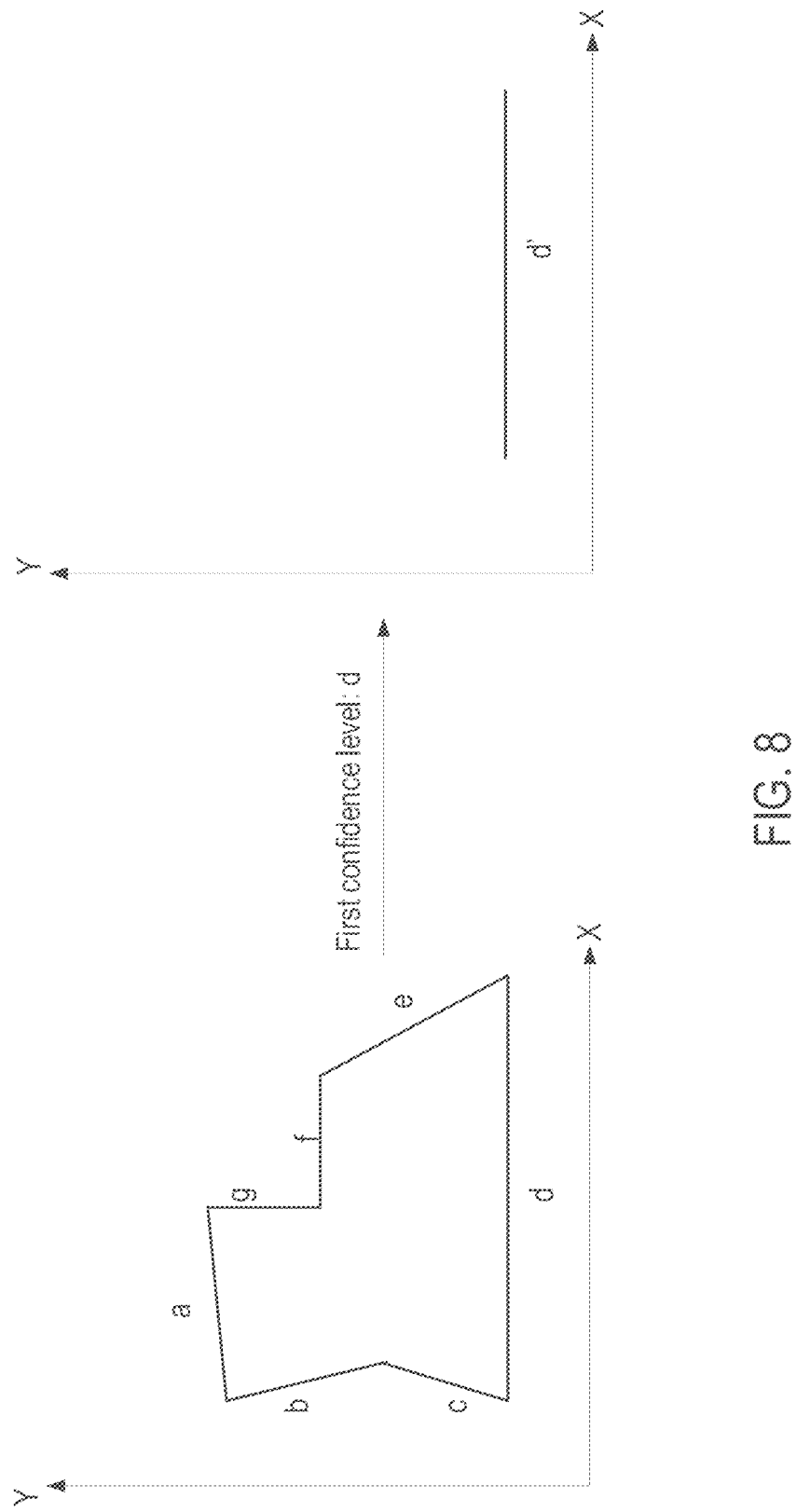
FIGS. 8-14 are block diagrams illustrating a process for correcting wall lines according to some embodiments of the disclosure.
Figure 9:
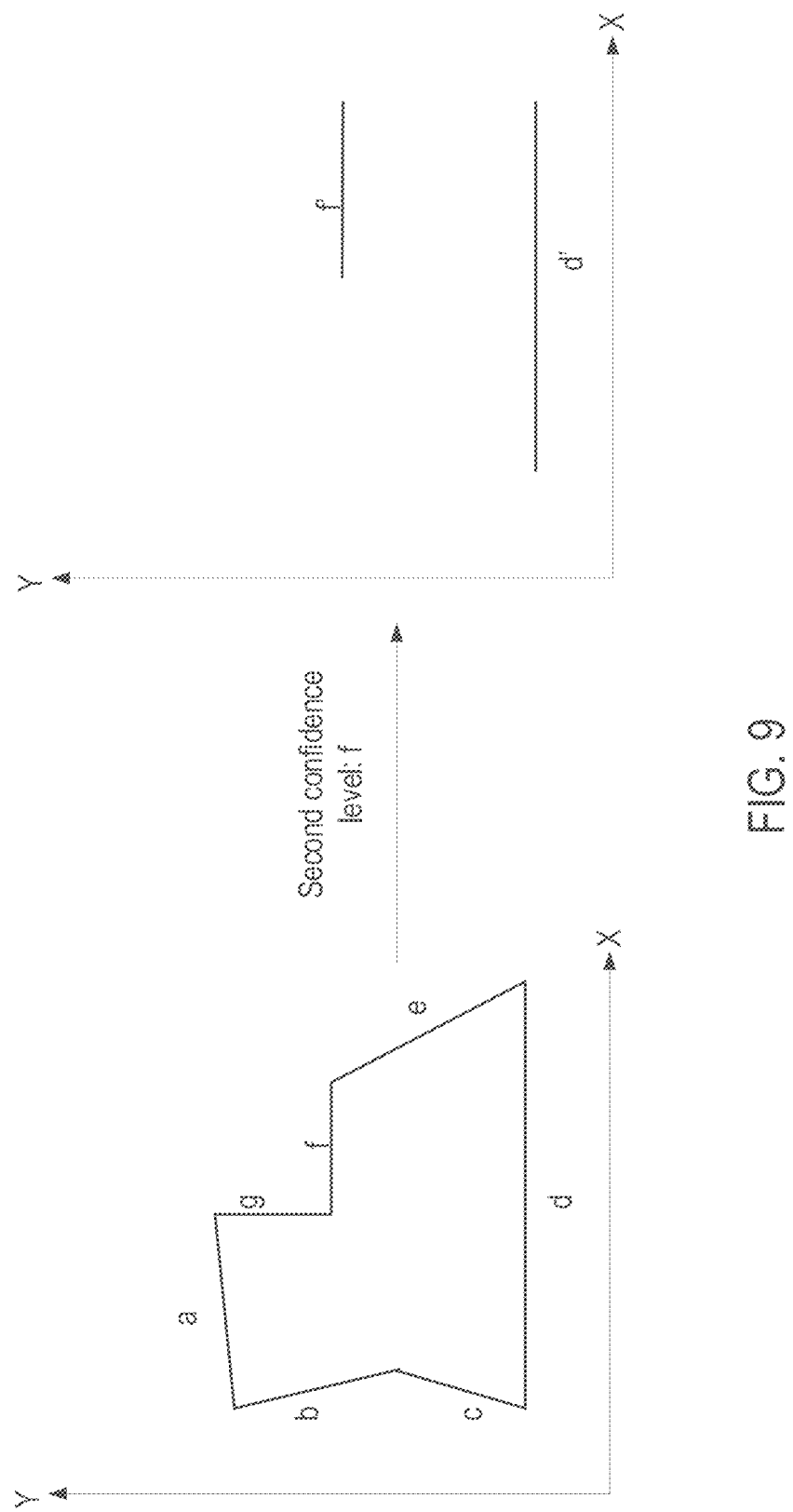

In an initial situation, based on the order of the above-described confidence levels, the line segment d is first determined as the first line segment that needs to be corrected. The adjacent line segment c and line segment e at the left and right sides of line segment d have not been corrected at this point. As such, a target coordinate axis corresponding to the first line segment is determined based on included angles formed by the line segment d with horizontal and vertical axes, respectively. An included angle between the line segment d and the target coordinate axis is smaller than an included angle between the line segment d and a non-target coordinate axis. In the example shown in FIG. 4, the target coordinate axis corresponding to the line segment d is the X axis. Further, as shown in FIG. 8, the line segment d is corrected into a straight-line segment, e.g., the line segment d', which is parallel to the target coordinate axis, e.g., the X axis.

In some embodiments, the method for acquiring the line segment d' is above-described: fitting a line segment extending through the midpoint of the line segment d and parallel to the target coordinate axis, e.g., the X axis, the fitted line segment being the line segment d'.

After the line segment d with the highest confidence level is corrected, the line segment f is the next one that needs to be corrected based on the order of the confidence levels. The adjacent line segment g and line segment e, at the left and right sides of the line segment f, respectively, have not been corrected at this point. As such, the correction process of the line segment f is substantially similar to the above-described correction process for the line segment d, the details of which are not repeated. A correction result of the line segment f is the line segment f shown in FIG. 9.

As illustrated, with the correction processes for the line segment d and the line segment f, after the first line segment that currently needs to be corrected is determined based on the respective confidence levels corresponding to the plurality of line segments, if the second line segment and the third line segment connected to the first line segment have not been corrected, the target coordinate axis corresponding to the first line segment is determined based on the included angles formed by the first line segment with the horizontal and vertical axes, respectively. The included angle between the first line segment and the target coordinate axis is smaller than the included angle between the first line segment and the non-target coordinate axis. Further, the first line segment is corrected into the straight line segment parallel to the target coordinate axis.

Figure 10:
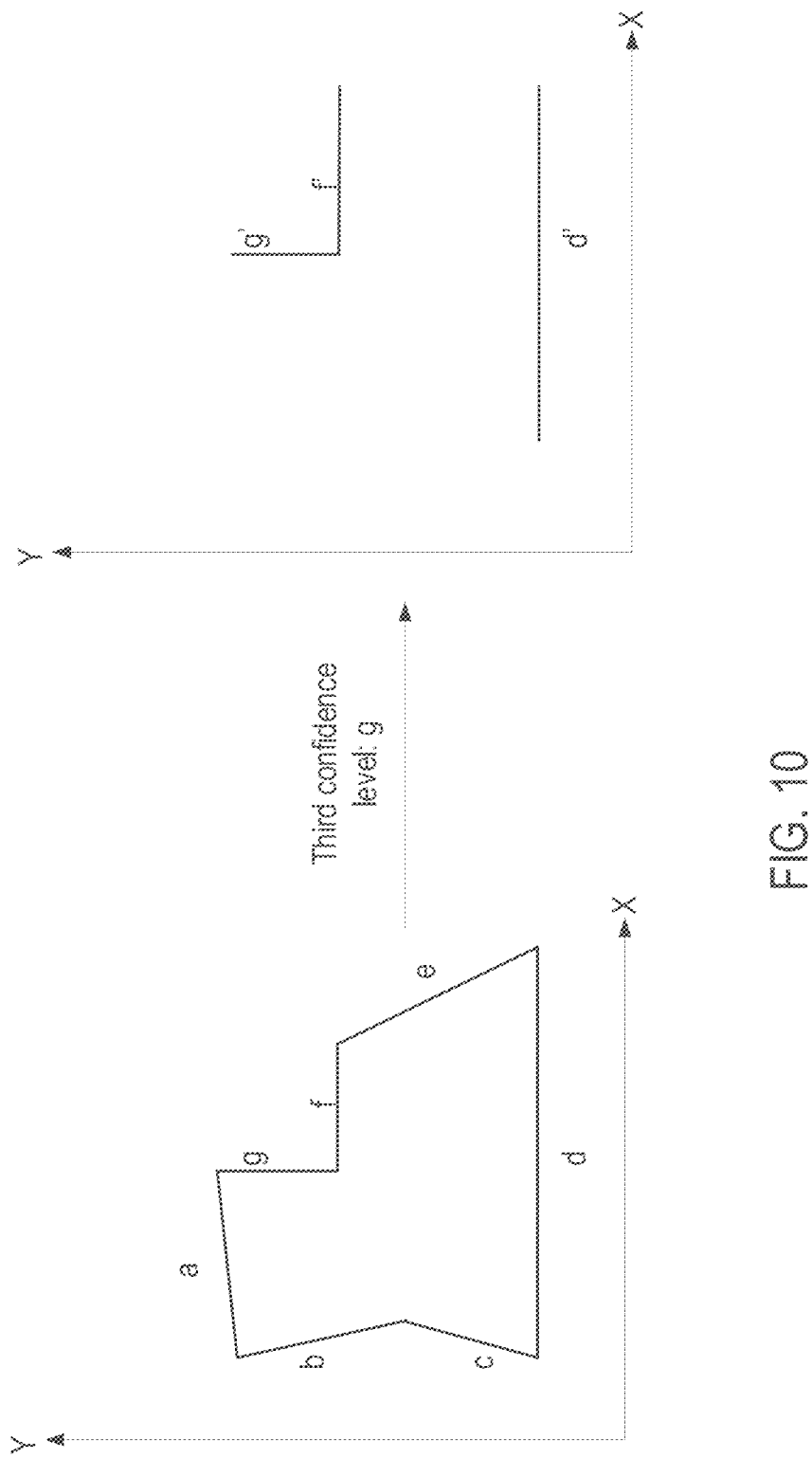

After the line segment f is corrected, the line segment g is the next one that needs to be corrected based on the order of the confidence levels. At this point, for the adjacent line segment f and the line segment a at the left and right sides of the line segment g, respectively, a line segment, e.g., the line segment f has been corrected, and the other line segment a has not been corrected. Therefore, to conform with the definition of the Manhattan-World structural features of the wall surfaces, e.g., the features of the adjacent line segments being in a perpendicular relationship, at this point, the line segment g is corrected into a straight line segment which is in a perpendicular relationship with the corrected line segment f. Corrected line segment g' is illustrated in FIG. 10.

Figure 11:
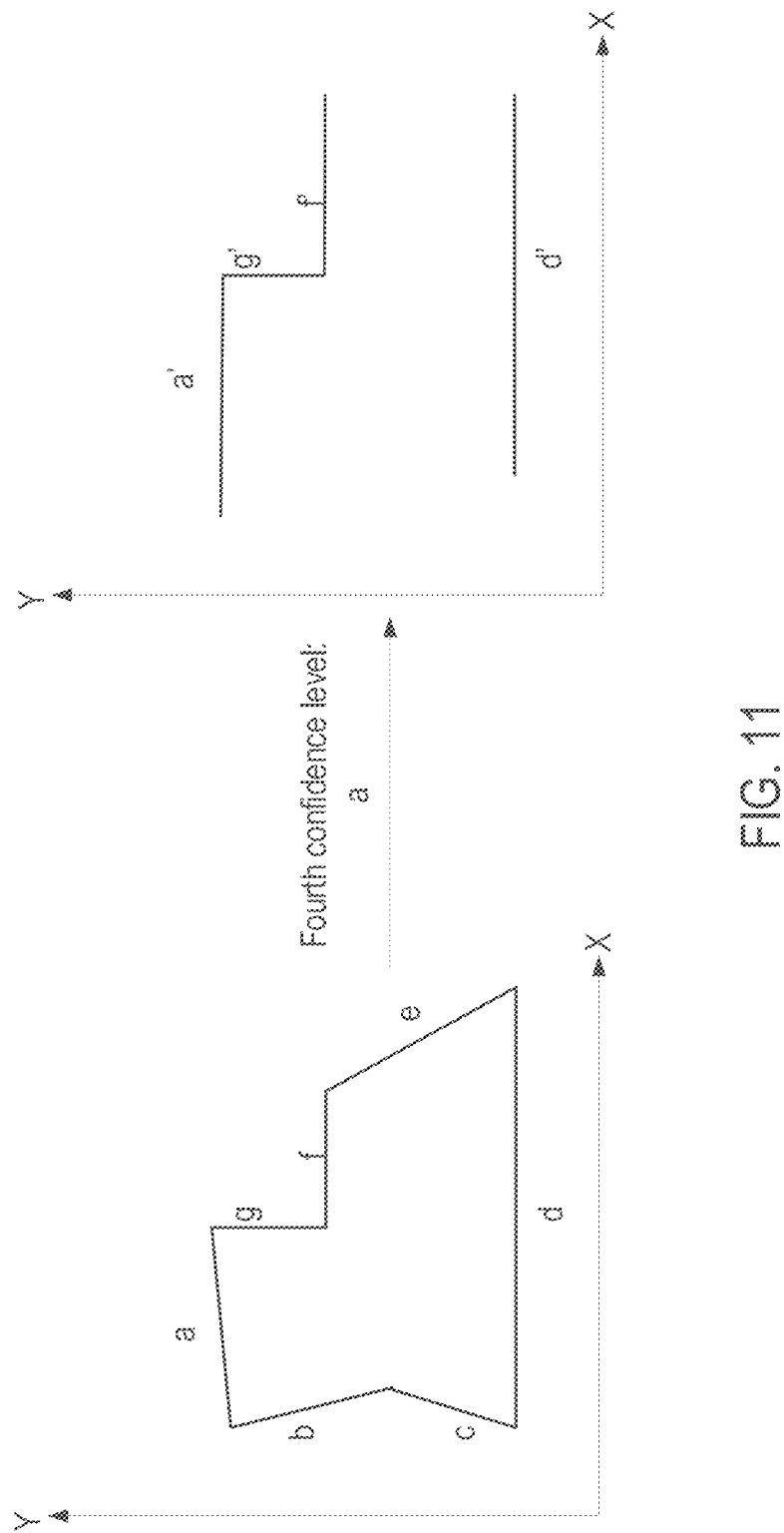

After the line segment g is corrected, the line segment a is the next one that needs to be corrected based on the order of the confidence levels. At this point, for the adjacent line segment b and line segment g, at the left and right sides of the line segment a, respectively, the line segment g has been corrected, and the other line segment b has not been corrected. Therefore, to meet the definition of the features that adjacent line segments are in a perpendicular relationship, at this point, the line segment a is corrected into a line segment which is in a perpendicular relationship with the correction result of the line segment g, e.g., the line segment g'. Corrected line segment a' is illustrated in FIG. 11.

Figure 12:
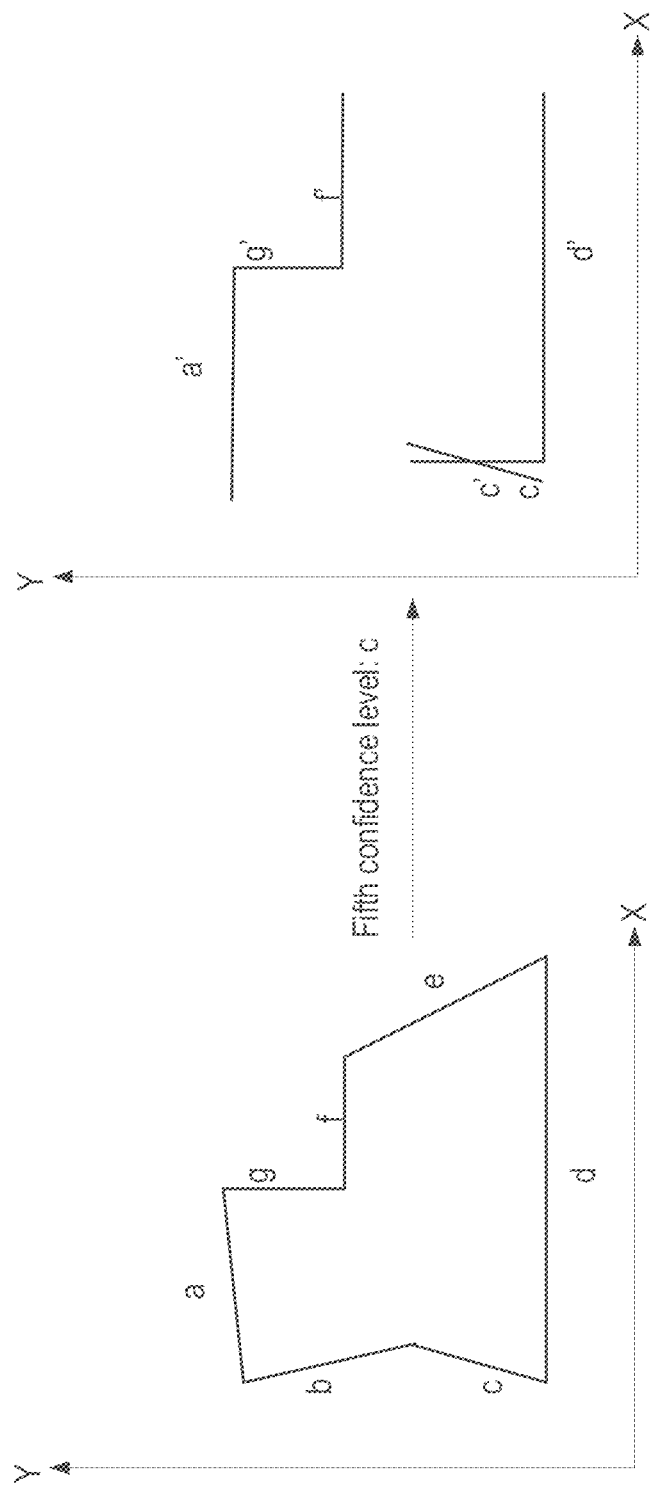

After the line segment a is corrected, the line segment c is the next one that needs to be corrected based on the order of the confidence levels. At this point, for the adjacent line segment b and line segment d, at the left and right sides of the line segment c, respectively, the line segment d has been corrected, and the other line segment b has not been corrected. Therefore, to meet the definition of the features that the adjacent line segments are in a perpendicular relationship, the line segment c is corrected into a line segment that is in a perpendicular relationship with the correction result of the line segment d, e.g., the line segment d'. Corrected segment c' is illustrated in FIG. 12.

As illustrated with the above-described exemplary correction processes for the line segment g, the line segment a, and the line segment c, after the first line segment that currently needs to be corrected is determined based on the respective confidence levels corresponding to the plurality of line segments, if, for the second line segment and the third line segment connected to the first line segment, the second line segment has been corrected and the third line segment has not been corrected, the first line segment is corrected into a straight line segment perpendicular to the corrected second line segment.

Figure 13:
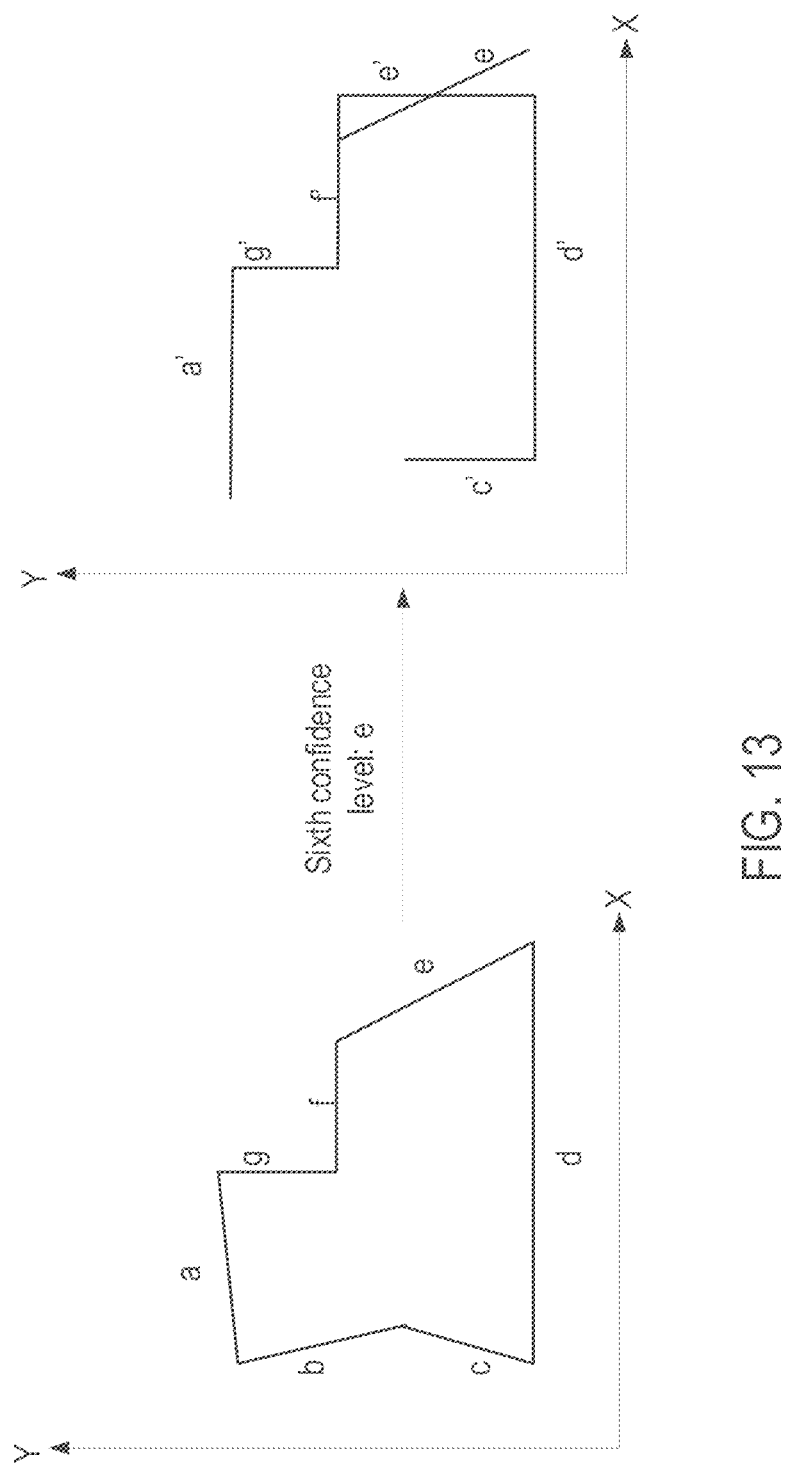
Figure 14:
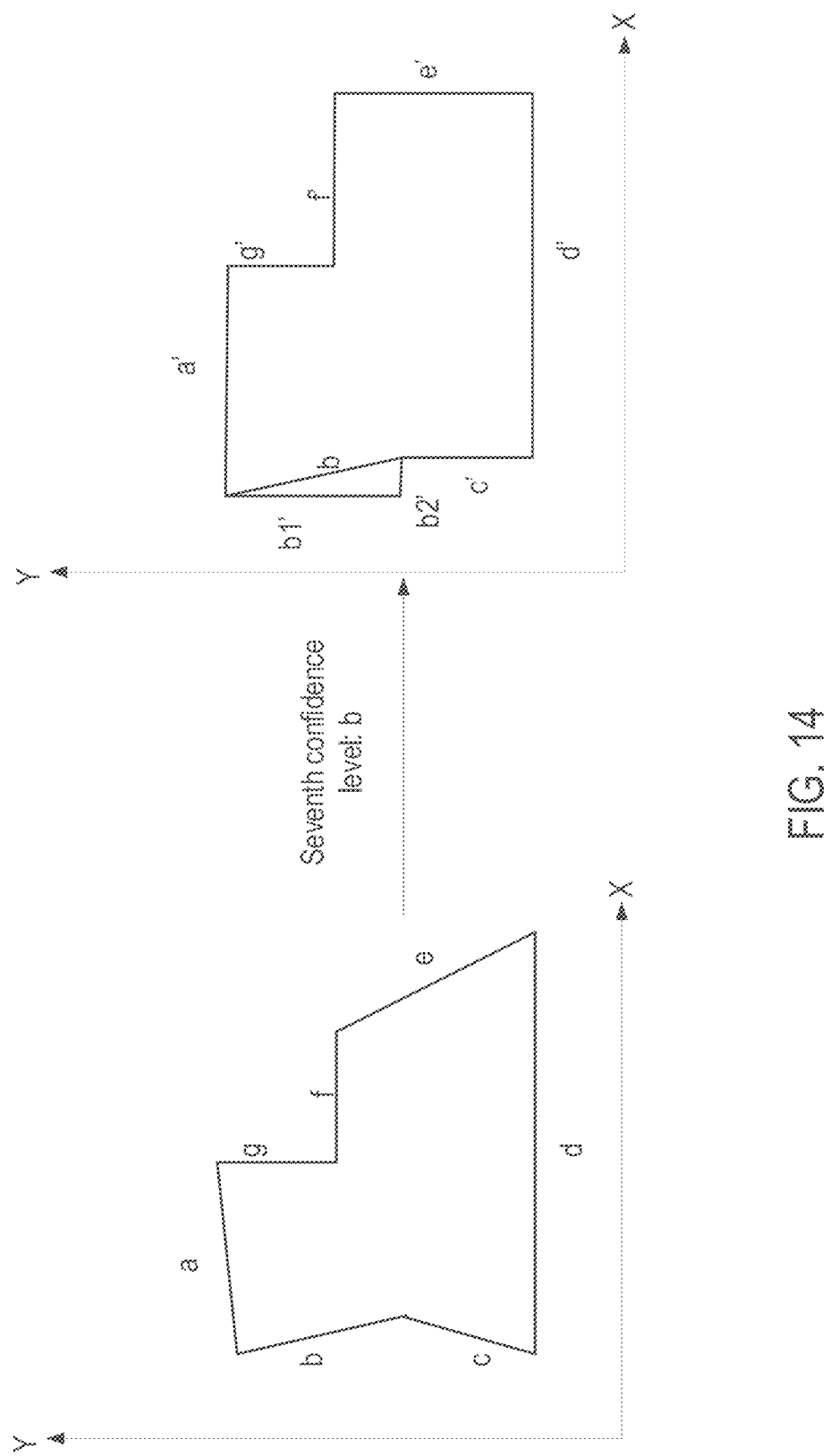

After the line segment c is corrected, the line segment e is the next one that needs to be corrected based on the order of the confidence levels. At this point, the adjacent line segment f and line segment d, at the left and right sides of the line segment e, respectively, have been corrected, and correction results of the line segment f and the line segment d, e.g., the line segment f and the line segment d', are in a parallel relationship. Thus, to conform with the definition of features that adjacent line segments are in the perpendicular relationship, the line segment e is corrected into a straight line segment that is perpendicular to the line segment f and the line segment d'. Corrected line segment e' is illustrated in FIG. 13.

In this example, a straight line segment extending through the midpoint of the line segment e, and perpendicular to the line segment f and the line segment d' is fitted as the line segment e'. At this point, if the line segment e' does intersect with the line segment f and/or the line segment d', the lengths of the line segment f and/or the line segment d' is adjusted based on the line segment e' such that an end point of the line segment f and an end point of the line segment d' respectively intersects with the line segment e'.

As illustrated above with the correction process for the line segment e, after the first line segment that currently needs to be corrected is determined based on the respective confidence levels corresponding to the plurality of line segments, if both the second line segment and the third line segment connected to the first line segment have been corrected, and the corrected second line segment and the corrected third line segment are in a parallel relationship, the first line segment is corrected into a straight line segment perpendicular to the corrected second line segment and the corrected third line segment.

After the line segment e is corrected, the line segment b is the final one that needs to be corrected based on the order of the confidence levels. At this point, both the adjacent line segment a and line segment c, at the left and right sides of the line segment b, respectively, have been corrected, and correction results of the line segment a and the line segment c, e.g., the line segment a' and the line segment c' are in a perpendicular relationship. Thus, to meet the definition of feature that adjacent line segments are in the perpendicular relationship, the line segment b is corrected into two catheti that have the line segment b as the hypotenuse, such as the line segment b1' and the line segment b2' shown in FIG. 14. As such, the cathetus b1' connected to the line segment a' is in a perpendicular relationship with the line segment a'; and the cathetus b2' connected to the line segment c' is in a perpendicular relationship with the line segment c'.

As illustrated above with the correction process for the line segment b, after the first line segment that currently needs to be corrected is determined based on the respective confidence levels corresponding to a plurality of line segments, if both the second line segment and the third line segment connected to the first line segment have been corrected, and the corrected second line segment and the corrected third line segment are in a perpendicular relationship, two catheti that have the first line segment as the hypotenuse are determined, and the first line segment is corrected into the two catheti.

With the above correction processes, the plurality of line segments shown in FIG. 4 are corrected into the plurality of line segments shown in FIG. 5. The plurality of line segments shown in FIG. 5 are reestablished to the panoramic image, thus completing the correction of the first wall line. The correction result of the first wall line is referred to herein as the second wall line. Therefore, the layout of the walls of the space is accurately determined based on the second wall line. Further, the creation of the three-dimensional model of the space is completed in conjunction with the camera photographing parameters. The camera photographing parameters include information such as the capturing height of the camera, e.g., the height of the camera from the ground. The height and the wall layout information of the space is determined based on imaging principles, the photographing parameters of the camera, and the determination result of the second wall line. As a result, the three-dimensional model is constructed.

Figure 15:
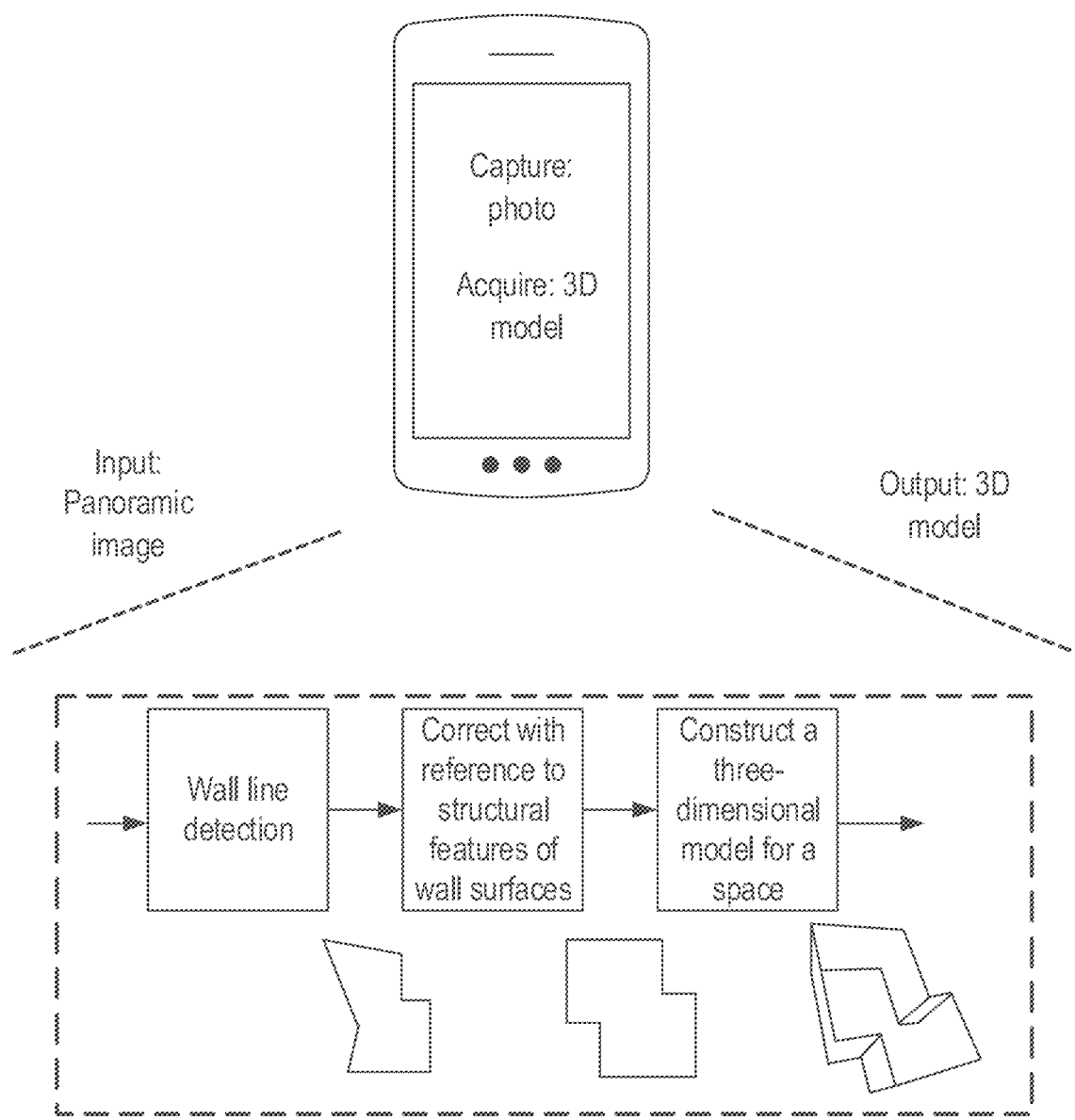
FIG. 15 is a block diagram illustrating a process for performing a spatial modeling method according to some embodiments of the disclosure.

To facilitate an understanding of the performing process of the above-described spatial modeling method, an example is illustrated with reference to FIG. 15. In FIG. 15, a user collects a panoramic image of a room using a camera, then performs wall line detection processing on the collected panoramic image to obtain preliminarily detected wall lines. Further, the preliminary detected wall lines are corrected based on the assumption that wall surfaces in the room conforming to the Manhattan-World structural features. In this example, the finally obtained wall lines are as shown in FIG. 15. Further, a three-dimensional model shown in FIG. 15 is constructed based on the finally obtained wall lines.

Figure 16:
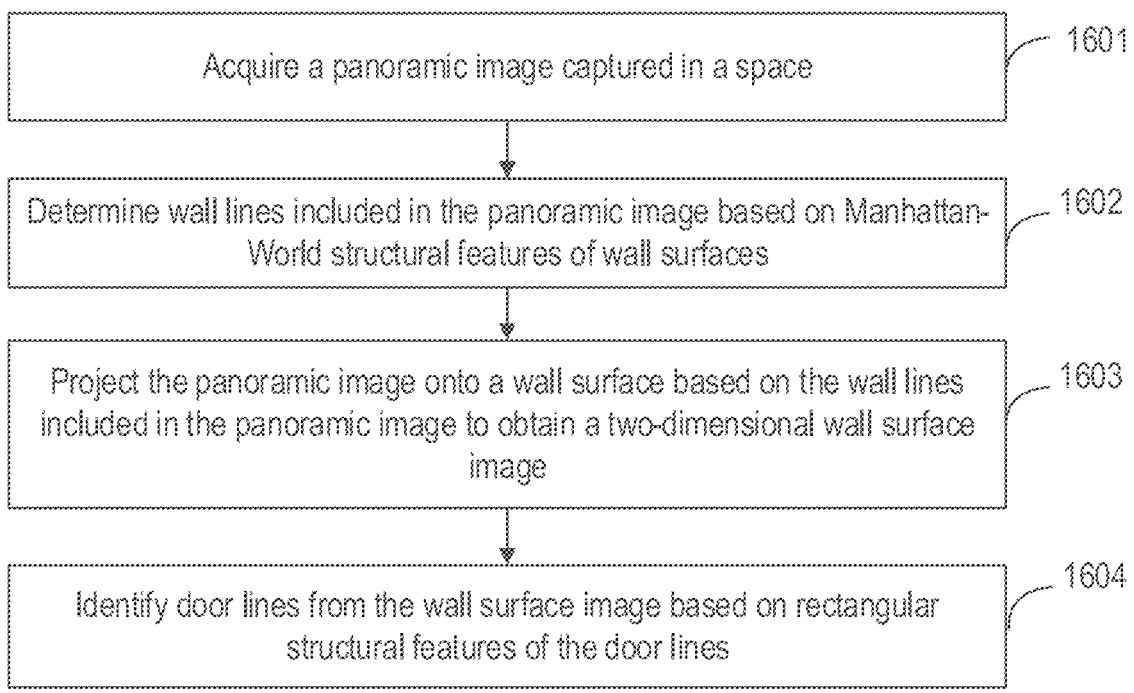
FIG. 16 is a flow diagram illustrating a method for spatial modeling according to some embodiments of the disclosure.

FIG. 16 is a flow diagram illustrating a method for spatial modeling based on some embodiments of the disclosure. In some embodiments and as shown in FIG. 16, the method includes the following steps.

Step 1601: acquire a panoramic image captured in a space.

Step 1602: determine wall lines included in the panoramic image based on Manhattan-World structural features of wall surfaces.

Step 1603: project the panoramic image onto a wall surface based on the wall lines included in the panoramic image to obtain a two-dimensional wall surface image.

Step 604: identify door lines from the wall surface image based on rectangular structural features of the door lines.

As illustrated with the above-described embodiments, a three-dimensional model of a space, such as a room, is constructed based on capturing of a panoramic image of the space, and a result of performing wall line detection on the panoramic image. In some scenarios, there are a plurality of spaces adjacent to each other, such as a plurality of rooms of a house. To construct a three-dimensional model for the plurality of spaces, based on a premise that the adjacent spaces are connected by doors, door line detection is performed on the panoramic image. Therefore, a three-dimensional model of a plurality of spaces is constructed based on a result of the door line detection. In some embodiments, after the three-dimensional model of each space is constructed based on the wall line detection result of each space, positional relationships of the plurality of spaces are determined based on the door line detection results. Afterwards, the respective three-dimensional models corresponding to the plurality of spaces are interconnected based on the positional relationship to obtain the three-dimensional model of the plurality of spaces.

In some embodiments, after door lines included in a panoramic image are detected, the door line detection result is output to the user such that the user completes interconnecting the respective three-dimensional models corresponding to the plurality of spaces based on the door line detection result.

When there are a plurality of adjacent spaces, a panoramic image is captured for each space. Therefore, by performing the wall line detection processing in the above-described embodiment on each panoramic image, the wall lines included in each panoramic image are obtained. Further, for a panoramic image, the door lines included in the panoramic image are detected based on the wall line detection result of the panoramic image.

In some embodiments, for a panoramic image, first, the panoramic image is projected onto a wall surface based on the wall lines included in the panoramic image to obtain a two-dimensional wall surface image. Further, the door lines are identified from the wall surface image based on rectangular structural features of the door lines.

The rectangular structural features of the door lines herein refer to the boundaries of a door, e.g., door lines, that are in a rectangular shape after being projected onto the wall surface. Vertical door lines at the left and right sides are perpendicular to the ground, and horizontal door lines at the upper and lower sides are parallel to the ground.

Based on this, after the panoramic image is projected onto a plurality of detected wall surfaces (e.g., each wall surface included in the space is boundary-wise defined by the detected wall lines), a plurality of wall surface images are obtained. With reference to the above-described rectangular structural features of the door lines, the door lines conforming to the features are detected from each wall surface image.

In some embodiments, a rectangular pattern detection is performed on the wall surface image to identify whether door lines are included therein. In some embodiments, to avoid interference from other lines in the wall surface image, height information of the door is further referred to, and lines not conforming with the height information of the door are filtered out from the wall surface image. For example, if the size of a detected rectangular pattern enclosed by four lines is obviously inconsistent with the size of a door, the rectangular pattern is filtered out.

In some embodiments, to improve the accuracy and detection efficiency in the door line detection result, the door lines are detected from the panoramic image by techniques such as deep learning. In one example, the method includes the following steps.

Step 1: projecting the panoramic image onto a wall surface based on the wall lines included in the panoramic image to obtain a two-dimensional wall surface image.

Step 2: extracting vertical line segments included in the wall surface image.

Step 3: performing binarization processing on the wall surface image to obtain a first binarized image, the first binarized image including only the above-described vertical line segments.

Step 4: inputting the first binarized image and the wall surface image into a door line detection model to output vertical door lines included in the wall surface image using the door line detection model.

Step 5: transposing the wall surface image.

Step 6: extracting the vertical line segments comprised in the transposed wall surface image.

Step 7: performing binarization processing on the transposed wall surface image to obtain a second binarized image, the second binarized image including only the vertical line segments in the transposed wall surface image.

Step 8: inputting the second binarized image and the transposed wall surface image into the door line detection model to output horizontal door lines included in the wall surface image using the door line detection model.

In some embodiments, to reduce computation, the transposing the wall surface image is implemented by carving out an image area including the vertical door lines from the wall surface image, and transposing the carved-out image area.

In some embodiments, the door line detection model is implemented using a network model such as a convolutional neural network, and the like. In some embodiments, to detect the door lines, two loss functions are defined. The first loss function is defined as: predicting a classification of each pixel in an input image (e.g., the above-described wall surface image, the transposed wall surface image), the classification reflecting whether the pixel is located in a door frame. For example, a predicted probability value of a pixel located in the door frame is 1, and a predicted probability value of a pixel not located in the door frame is 0. The physical meaning of the second loss function is to predict a distance from each pixel in the input image (e.g., the above-described wall surface image, and the transposed wall surface image) to the nearest door line.

Figure 17:
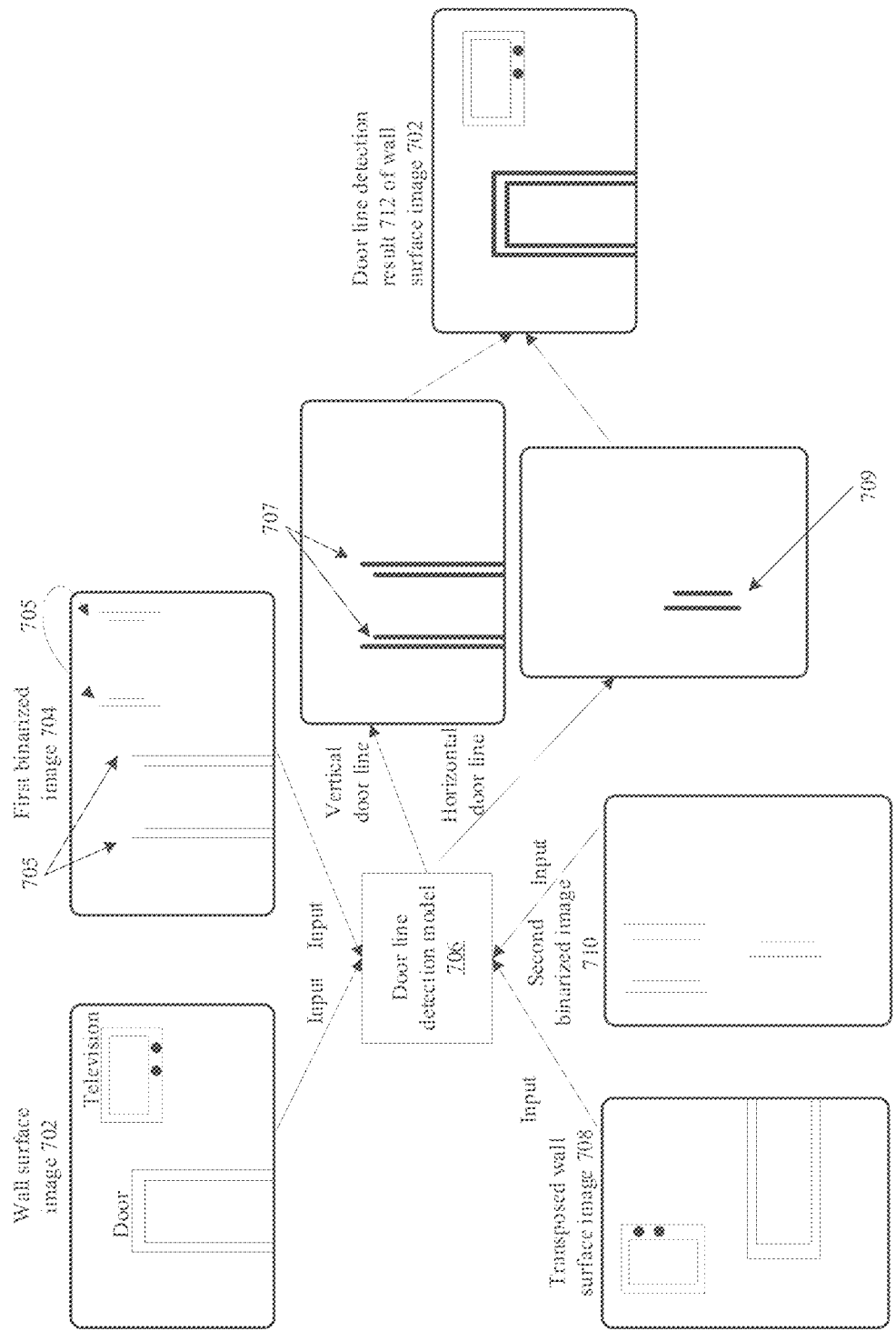
FIG. 17 is a block diagram illustrating a principle for detecting door lines according to some embodiments of the disclosure.

FIG. 17 is a block diagram illustrating a method for detecting door lines according to some embodiments of the disclosure.

In this example, a result of projecting a panoramic image onto a wall surface is shown herein FIG. 17. The wall surface image 702 includes a door and a television. As shown herein, vertical line segments of the wall surface image are extracted, and a first binarized image 704 corresponding to the wall surface image is generated based on the extraction result. In the first binarized image 704, the vertical line segments 705 extracted from the wall surface image are represented in black, and contents at other positions in the wall surface image are represented in white. In some embodiments, when vertical line segment extraction is performed, a vertical line segment having a length less than a preset threshold is filtered out. The threshold is set based on the size of a door.

Further, the first binarized image 704 and the wall surface image 702 are inputted into the door line detection model 706 as input. The door line detecting model 706 determines vertical door lines 707 included in the wall surface image based on the prediction results of pixels in the wall surface image that are located in a door frame as well as distances from the pixels to the nearest door lines.

Next, the wall surface image 702 is transposed (e.g., equivalent to being rotated by 90 degrees), and vertical line segments included in the transposed wall surface image 708 are extracted. Further, a second binarized image 710 is generated based on the extraction result. Then, the second binarized image 710 and the transposed wall surface image 708 are inputted to the door line detection model 706. The door line detecting model 706 determines vertical door lines 709 included in the wall surface image based on the prediction results of pixels in the wall surface image that are located in a door frame as well as distances from the various pixel to the nearest door lines. The vertical door lines detected at this point are actually real-world horizontal door lines as the wall surface image is transposed. In the end, a door line detection result 712 of wall surface image 702 is generated based on the door lines 707 and 709.

In some embodiments, the wall line detection is performed based on the Manhattan-World structural features of the wall surfaces. In one example, the wall line detection is performed with reference to an object related to the wall surfaces in the space. The following illustrates a method for wall line determination, the method including the following steps.

Step 1: acquiring a picture captured in a space.

Step 2: identifying a preset object in the picture.

Step 3: determining wall lines included in the picture based on an association relationship between the object and wall surfaces.

In some embodiments, the picture is a panoramic image obtained by capturing a panoramic image for the space, or a plurality of pictures captured at a position in the space in different directions, or several frames of images in a video obtained by capturing a video of the space.

In some embodiments, the above-described preset object is an object that has an association relationship with the wall surfaces. For example, in a scenario of a home space, the space is a room of the home, and the preset object is a television, a window, a sofa, and the like, that is positioned (e.g., affixed, located) at a wall surface. These objects are identified from the captured picture based on features of these objects.

In some examples, the association relationships between these objects and the wall surfaces are reflected in the positional relationships between these objects and the wall surfaces. Taking the television as an example, after the television is identified from the picture, based on the fact that the television is generally installed in the middle or lower part of the wall surface as well as in a parallel relationship between a boundary line of the television and a boundary line of the associated wall surface, a wall line is detected in an area around the television.

Figure 18:
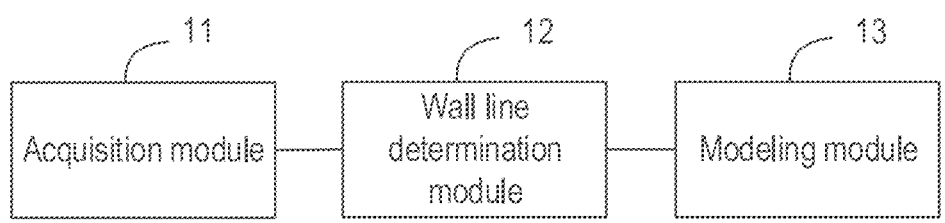
FIG. 18 is a block diagram illustrating an apparatus for spatial modeling according to some embodiments of the disclosure.

FIG. 18 is a block diagram illustrating an apparatus for spatial modeling apparatus according to some embodiments of the disclosure. In some embodiments and as shown in FIG. 18, the apparatus for spatial modeling includes: an acquisition module (11), a wall line determination module (12), and a modeling module (13).

The acquisition module (11) is configured to acquire a panoramic image captured in a space.

The wall line determination module (12) is configured to determine wall lines included in the panoramic image based on Manhattan-World structural features of wall surfaces.

The modeling module (13) is configured to construct a three-dimensional model of the space based on the wall lines.

In some embodiments, the wall line determination module (12) is further configured to: input the panoramic image into a wall line detection model to output a first wall line using the wall line detection model; and correct the first wall line based on Manhattan-World structural features of the wall surfaces to obtain a second wall line. As such the modeling module (13) is further configured to construct the three-dimensional model of the space based on the second wall line.

In some embodiments, the wall line determination module (12) is further configured to: map the first wall line onto a horizontal plane to obtain a plurality of line segments corresponding to the first wall line; correct the plurality of line segments based on the Manhattan-World structural features of the wall surfaces; and map the plurality of corrected line segments into the panoramic image to obtain the second wall line.

In some embodiments, the wall line determination module (12) is further configured to: determine respective confidence levels corresponding to the plurality of line segments; and sequentially correct the plurality of line segments based on an order of the confidence levels ranking from high to low such that the corrected adjacent line segments are in a perpendicular relationship.

In some embodiments, the wall line determination module (12) is further configured to: for a line segment in the plurality of line segments, determine a target coordinate axis corresponding to the line segment based on included angles formed by the line segment with horizontal and vertical axes, respectively, an included angle between the line segment and the target coordinate axis being smaller than an included angle between the line segment and a non-target coordinate axis; fit a fitted line segment extending through a midpoint of the line segment, the fitted line segment being parallel to the target coordinate axis; determine distances from a plurality of points on the line segment to the fitted line segment respectively; and determine a ratio of the number of points whose distance is less than a set threshold to the total number of the plurality of points, and designate the ratio as the confidence level of the line segment.

In some embodiments, the wall line determination module (12) is further configured to: for a line segment in the plurality of line segments, determine a target coordinate axis corresponding to the line segment based on included angles formed by the line segment with horizontal and vertical axes, respectively, an included angle between the line segment and the target coordinate axis being smaller than an included angle between the line segment and a non-target coordinate axis, and designate the included angle between the line segment and the target coordinate axis as the confidence level of the line segment.

In some embodiments, the wall line determination module (12) is further configured to: determine, based on the respective confidence levels corresponding to the plurality of line segments, a first line segment that needs to be corrected; if both a second line segment and a third line segment connected to the first line segment have not been corrected, determine a target coordinate axis corresponding to the first line segment based on included angles formed by the first line segment with horizontal and vertical axes respectively, wherein an included angle between the first line segment and the target coordinate axis is smaller than an included angle between the first line segment and a non-target coordinate axis; and correct the first line segment into a straight line segment parallel to the target coordinate axis.

In some embodiments, the wall line determination module (12) is further configured to: determine, based on the respective confidence levels corresponding to the plurality of line segments, a first line segment that needs to be corrected; and if, for a second line segment and a third line segment connected to the first line segment, the second line segment has been corrected and the third line segment has not been corrected, correct the first line segment into a straight line segment perpendicular to the corrected second line segment.

In some embodiments, the wall line determination module (12) is further configured to: determine, based on the respective confidence levels corresponding to the plurality of line segments, a first line segment that needs to be corrected; if both a second line segment and a third line segment connected to the first line segment have been corrected, and the corrected second line segment and the corrected third line segment are in a perpendicular relationship, determine two catheti having the first line segment as the hypotenuse, and correct the first line segment into the two catheti.

In some embodiments, the wall line determination module (12) is further configured to: determine, based on the respective confidence levels corresponding to the plurality of line segments, a first line segment that needs to be corrected; and if both a second line segment and a third line segment connected to the first line segment have been corrected, and the corrected second line segment and the corrected third line segment are in a parallel relationship, correct the first line segment into a straight line segment perpendicular to the corrected second line segment and the corrected third line segment.

In some embodiments, the apparatus further includes a door line determination module configured to: project the panoramic image onto a wall surface based on the wall lines included in the panoramic image to obtain a two-dimensional wall surface image; and identify the door lines from the wall surface image based on rectangular structural features of the door lines.

In some embodiments, the door line determination module is further configured to: extract vertical line segments included in the wall surface image; perform binarization processing on the wall surface image to obtain a first binarized image, the first binarized image including only the vertical line segments; input the first binarized image and the wall surface image into a door line detection model to output vertical door lines included in the wall surface image using the door line detection model; transpose the wall surface image; extract vertical line segments included in the transposed wall surface image; perform binarization processing on the transposed wall surface image to obtain a second binarized image, the second binarized image including only the vertical line segments in the transposed wall surface image; and input the second binarized image and the transposed wall surface image into the door line detection model to output horizontal door lines included in the wall surface image using the door line detection model.

In some embodiments, the door line determination module is further configured to: carve out an image area including the vertical door lines from the wall surface image; and transpose the image area.

In some embodiments, the door line detection model is configured to predict a classification of each pixel in the wall surface image and the transposed wall surface image, the classification reflecting whether the pixel is located in a door frame.

In some embodiments, the door line detection model is configured to predict a distance from each pixel in the wall surface image and the transposed wall surface image to the nearest door line.

In various embodiments, the apparatus for spatial modeling of FIG. 18 is configured to implement the methods above-described with connection to in FIGS. 1-17, the details of which are not repeated herein.

Figure 19:
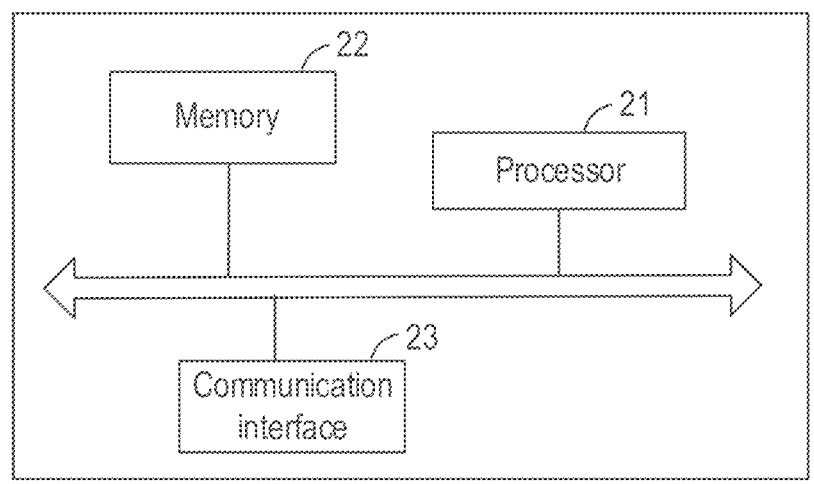
FIG. 19 is a block diagram illustrating an electronic device corresponding to the apparatus for spatial modeling of FIG. 18, according to some embodiments of the disclosure.

FIG. 19 is a block diagram illustrating an electronic device for spatial modeling according some embodiments of the disclosure. In some embodiments and as shown in FIG. 19, the electronic device includes a processor (21), and a memory (22). The memory (22) is configured to store thereon executable code that, when executed by the processor (21), causes the electronic device to implement the methods above-described with connection to FIGS. 1-17.

In some embodiments, the electronic device also includes a communication interface (23) configured to communicate with another device or communication network.

In some embodiments, the disclosure provides a non-transitory machine-readable storage medium. The non-transitory machine-readable storage medium is configured to store thereon executable code that, when executed by a processor of an electronic device, causes the electronic device to perform the methods above-described with connection to FIGS. 1-17.

The apparatus embodiments are merely described schematically above, and the various modules described as separate components may or may not be physically separated. The objective of the solution of this embodiment may be implemented by selecting some or all of the modules based on actual requirements. Those of ordinary skill in the art could understand and implement the disclosure without significant efforts.

Through the preceding description of the implementation manners, those skilled in the art can clearly understand that the implementation manners can be implemented by software plus a necessary general hardware platform, and certainly can also be implemented by a combination of hardware and software. Based on such understanding, the above technical solution essentially or the portion contributing to the prior art may be embodied in the form of a computer product. The disclosure may adopt the form of a computer program product implemented on one or a plurality of computer-usable storage media (including but not limited to a magnetic disk storage, a CD-ROM, an optical storage, etc.) containing computer-usable program code therein.

It should be finally noted that the above embodiments are merely used for illustrating rather than limiting the technical solutions of the disclosure. Although the disclosure is described in detail with reference to the foregoing embodiments, those of ordinary skill in the art should understand that the technical solutions recorded in the foregoing embodiments may still be modified or equivalent replacement may be made on part or all of the technical features therein. These modifications or replacements will not make the essence of the corresponding technical solutions be departed from the spirit and scope of the technical solutions in the embodiments of the disclosure.

What is claimed is:

1. A method, comprising:
acquiring a panoramic image of a three-dimensional space;
inputting the panoramic image into a wall line detection model;
obtaining a first wall line using the wall line detection model;
mapping the first wall line onto a horizontal plane to obtain a plurality of line segments corresponding to the first wall line;
correcting the plurality of line segments based on Manhattan-World structural features of wall surfaces;
mapping the plurality of corrected line segments to the panoramic image to obtain a second wall line; and
constructing a three-dimensional model for the space based on the second wall line.

2. The method of claim 1, the correcting the plurality of line segments comprising:
determining respective confidence levels corresponding to each of the plurality of line segments; and
sequentially correcting the plurality of line segments based on an order of the confidence levels ranking from high to low, wherein adjacent line segments after the correction are perpendicular.

3. The method of claim 2, the determining respective confidence levels comprising:
determining, for a respective line segment of the plurality of line segments, a target coordinate axis corresponding to the line segment based on angles formed by the respective line segment with horizontal and vertical axes, an included angle between the line segment and the target coordinate axis being smaller than a second included angle between the line segment and a non-target coordinate axis;

fitting a fitted line segment extending through a midpoint of the line segment, the fitted line segment being parallel to the target coordinate axis;
determining respective distances from a plurality of points on the line segment to the fitted line segment;
determining a ratio between a number of points from which a distance to the fitted line is less than a set threshold and a total number of the plurality of points; and
designating the ratio as a confidence level of the line segment.

4. The method of claim 2, the determining respective confidence levels comprising:
determining, for a respective line segment of the plurality of line segments, a target coordinate axis corresponding to the line segment based on angles formed by the respective line segment with horizontal and vertical axes, an included angle between the line segment and the target coordinate axis being smaller than a second included angle between the line segment and a non-target coordinate axis; and
designating the included angle between the line segment and the target coordinate axis as a confidence level of the line segment.

5. The method of claim 2, the sequentially correcting the plurality of line segments comprising:
determining, based on the respective confidence levels corresponding to the plurality of line segments, a first line segment to be corrected;
if both a second line segment and a third line segment connected to the first line segment have not been corrected, determining a target coordinate axis corresponding to the first line segment based on included angles formed by the first line segment with horizontal and vertical axes, an included angle between the first line segment and the target coordinate axis being smaller than an included angle between the first line segment and a non-target coordinate axis; and
correcting the first line segment into a line segment parallel to the target coordinate axis.

6. The method of claim 2, the sequentially correcting the plurality of line segments comprising:
determining, based on the respective confidence levels corresponding to the plurality of line segments, a first line segment to be corrected; and
for a second line segment and a third line segment connected to the first line segment, the second line segment having been corrected and the third line segment having not been corrected, correcting the first line segment into a straight line segment perpendicular to a corrected second line segment.

7. The method of claim 2, the sequentially correcting the plurality of line segments comprising:
determining, based on the confidence levels respectively corresponding to the plurality of line segments, a first line segment to be corrected;
if both a second line segment and a third line segment connected to the first line segment have been corrected and a corrected second line segment and a corrected third line segment are in a perpendicular relationship, determining two catheti having the first line segment as a hypotenuse; and
correcting the first line segment based on the two catheti.

8. The method of claim 2, the sequentially correcting the plurality of line segments comprising:

determining, based on the respective confidence levels corresponding to the plurality of line segments, a first line segment to be corrected; and
if both a second line segment and a third line segment connected to the first line segment have been corrected and a corrected second line segment and a corrected third line segment are in a parallel relationship, correcting the first line segment into a straight line segment perpendicular to the corrected second line segment and the corrected third line segment.

9. The method of claim 1, further comprising:
projecting the panoramic image onto a wall surface based on the wall lines in the panoramic image to obtain a two-dimensional wall surface image; and
identifying door lines from the wall surface image based on rectangular structural features of the door lines.

10. The method of claim 9, the identifying door lines from the wall surface image comprising:
extracting vertical line segments in the wall surface image;
performing binarization on the wall surface image to obtain a first binarized image, the first binarized image comprising only the vertical line segments;
inputting the first binarized image and the wall surface image into a door line detection model to output vertical door lines in the wall surface image using the door line detection model;
transposing the wall surface image;
extracting vertical line segments in the transposed wall surface image;
performing binarization on the transposed wall surface image to obtain a second binarized image, the second binarized image comprising only vertical line segments in the transposed wall surface image; and
inputting the second binarized image and the transposed wall surface image into the door line detection model to output horizontal door lines in the wall surface image using the door line detection model.

11. The method of claim 10, transposing the wall surface image comprising:
carving out an image area comprising the vertical door lines from the wall surface image; and
transposing the image area.

12. The method of claim 10, the door line detection model configured to predict a classification of a pixel in the wall surface image and the transposed wall surface image, the classification reflecting whether the pixel is located in a door frame.

13. An apparatus comprising:
a processor; and
a storage medium for tangibly storing thereon program logic for execution by the processor, the stored program logic comprising:
logic, executed by the processor, for acquiring a panoramic image, the panoramic image captured in a space,
logic, executed by the processor, for inputting the panoramic image into a wall line detection model,
logic, executed by the processor, for obtaining a first wall line using the wall line detection model,
logic, executed by the processor, for mapping the first wall line onto a horizontal plane to obtain a plurality of line segments corresponding to the first wall line,
logic, executed by the processor, for correcting the plurality of line segments based on Manhattan-World structural features of wall surfaces, logic, executed by the processor, for mapping the plurality of corrected line segments to the panoramic image to obtain a second wall line, and logic, executed by the processor, for constructing a three-dimensional model for the space based on the second wall line.

14. The apparatus of claim 13, the correcting the plurality of line segments comprising:

determining respective confidence levels corresponding to each of the plurality of line segments; and sequentially correcting the plurality of line segments based on an order of the confidence levels ranking from high to low, wherein adjacent line segments after the correction are perpendicular.

15. The apparatus of claim 13, the program logic further comprising:

logic, executed by the processor, for projecting the panoramic image onto a wall surface based on the wall lines in the panoramic image to obtain a two-dimensional wall surface image; and logic, executed by the processor, for identifying door lines from the wall surface image based on rectangular structural features of the door lines.

16. A non-transitory computer-readable storage medium for tangibly storing computer program instructions capable of being executed by a computer processor, the computer program instructions defining steps of:

acquiring a panoramic image, the panoramic image captured in a space;

inputting the panoramic image into a wall line detection model;

obtaining a first wall line using the wall line detection model;

mapping the first wall line onto a horizontal plane to obtain a plurality of line segments corresponding to the first wall line;

correcting the plurality of line segments based on Manhattan-World structural features of wall surfaces;

mapping the plurality of corrected line segments to the panoramic image to obtain a second wall line; and constructing a three-dimensional model for the space based on the wall lines.

17. The non-transitory computer-readable storage medium of claim 16, the correcting the plurality of line segments comprising:

determining respective confidence levels corresponding to each of the plurality of line segments; and sequentially correcting the plurality of line segments based on an order of the confidence levels ranking from high to low, wherein adjacent line segments after the correction are perpendicular.

18. The non-transitory computer-readable storage medium of claim 16, the steps further comprising:

projecting the panoramic image onto a wall surface based on the wall lines in the panoramic image to obtain a two-dimensional wall surface image; and identifying door lines from the wall surface image based on rectangular structural features of the door lines.

* * * * *